United States Patent
Paul

(10) Patent No.: US 10,767,572 B2
(45) Date of Patent: Sep. 8, 2020

(54) SUPPORTING ARRANGEMENT FOR AN ECCENTRIC MEMBER OF AN ADJUSTING ARRANGEMENT, AND ADJUSTING ARRANGEMENT

(71) Applicant: Dr. Ing. h.c. F. Porsche Aktiengesellschaft, Stuttgart (DE)

(72) Inventor: Michael Paul, Weissach (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/458,237

(22) Filed: Jul. 1, 2019

(65) Prior Publication Data
US 2020/0003130 A1    Jan. 2, 2020

(30) Foreign Application Priority Data

Jun. 29, 2018   (DE) .......................... 10 2018 115 727

(51) Int. Cl.
| | | |
|---|---|---|
| *F02D 15/02* | (2006.01) | |
| *F16C 7/06* | (2006.01) | |
| *F16K 31/52* | (2006.01) | |
| *F02F 5/00* | (2006.01) | |

(52) U.S. Cl.
CPC ................ *F02D 15/02* (2013.01); *F16C 7/06* (2013.01); *F16K 31/52* (2013.01); *F02F 5/00* (2013.01)

(58) Field of Classification Search
CPC ........ F02D 15/02; F16C 7/06; F16C 2229/00; F16C 2360/22; F16C 7/023; F16C 7/02; F16C 7/00; F16C 11/02; F16K 31/52; F02F 5/00; F16J 7/00; F02B 75/045; F02B 75/065
See application file for complete search history.

(56) References Cited

U.S. PATENT DOCUMENTS

| | | | | |
|---|---|---|---|---|
| 2,989,954 A | * | 6/1961 | Hulbert ................... | F02B 75/04 123/48 B |
| 5,724,863 A | * | 3/1998 | Kramer ................... | F02B 41/04 123/48 R |
| 6,907,849 B2 | * | 6/2005 | Galvin .................... | F02B 75/38 123/48 A |

(Continued)

FOREIGN PATENT DOCUMENTS

DE    10 2005 055 199    5/2007

*Primary Examiner* — Hung Q Nguyen
*Assistant Examiner* — Brian P Monahon
(74) *Attorney, Agent, or Firm* — Gerald E. Hespos; Michael J. Porco; Matthew T. Hespos

(57) ABSTRACT

A supporting arrangement for an eccentric member (8) of an adjusting arrangement (6) of a connecting rod (2) of a reciprocating piston internal combustion engine having at least one piston rod (18) that is guided displaceably by a piston (20) and a seal member (24) is connected to the supporting piston (20) in a supporting cylinder (12, 14) which is provided in the connecting rod (2) and has a longitudinal axis (16). The supporting piston (20) enclosing at least one cylinder chamber (22) with the supporting cylinder (12, 14). A side (28) of the supporting piston (20) that is directed toward the cylinder chamber (22) has a brake piston (30) that can be moved in the longitudinal axis (16). The brake piston (30) is mounted on the supporting piston (20) and can be prestressed by a spring (32).

7 Claims, 2 Drawing Sheets

(56) References Cited

U.S. PATENT DOCUMENTS

| | | | | |
|---|---|---|---|---|
| 7,334,554 | B2* | 2/2008 | Galvin | F02B 75/044 123/193.6 |
| 9,546,733 | B2* | 1/2017 | Miyamoto | F02F 3/0015 |
| 2004/0187634 | A1* | 9/2004 | Meyer | F16C 7/04 74/581 |
| 2006/0249103 | A1* | 11/2006 | Valdivia | F02B 75/044 123/41.35 |
| 2015/0059683 | A1* | 3/2015 | Schulze | F02B 75/32 123/197.3 |
| 2015/0075497 | A1* | 3/2015 | Hutzelmann | F02B 75/044 123/48 A |
| 2015/0252750 | A1* | 9/2015 | Galvin | F02F 3/0015 123/193.6 |
| 2015/0300272 | A1* | 10/2015 | Pluta | F02B 75/045 123/48 R |
| 2016/0258353 | A1* | 9/2016 | Paul | F02B 75/045 |
| 2016/0265448 | A1* | 9/2016 | Kaufmann | F16C 11/069 |
| 2016/0305471 | A1* | 10/2016 | Wittek | F16C 23/10 |
| 2016/0319737 | A1* | 11/2016 | Schaffrath | F02B 75/045 |
| 2017/0082021 | A1* | 3/2017 | Schaffrath | F16C 23/10 |
| 2017/0122198 | A1* | 5/2017 | Hutzelmann | F15B 11/20 |
| 2017/0328276 | A1* | 11/2017 | Kamo | F15B 11/22 |
| 2018/0094552 | A1* | 4/2018 | Mudra | F16C 23/10 |
| 2018/0149095 | A1* | 5/2018 | Yamane | F02D 41/0077 |
| 2018/0238382 | A1* | 8/2018 | Huber | F16C 23/10 |
| 2018/0328274 | A1* | 11/2018 | Dury | F02B 75/04 |
| 2018/0328276 | A1* | 11/2018 | Mudra | F02B 75/045 |
| 2018/0371986 | A1* | 12/2018 | Huber | B23K 20/227 |
| 2018/0371987 | A1* | 12/2018 | Mudra | F16K 31/363 |
| 2019/0186353 | A1* | 6/2019 | Jung | F16C 11/0623 |
| 2019/0383311 | A1* | 12/2019 | Misala | F02B 75/045 |

* cited by examiner

SUPPORTING ARRANGEMENT FOR AN ECCENTRIC MEMBER OF AN ADJUSTING ARRANGEMENT, AND ADJUSTING ARRANGEMENT

CROSS REFERENCE TO RELATED APPLICATION

This application claims priority under 35 USC 119 to German Patent Appl. No. 10 2018 115 727.4 filed on Jun. 29, 2018, the entire disclosure of which is incorporated herein by reference.

BACKGROUND

Field of the Invention

The invention relates to a supporting arrangement for an eccentric member of an adjusting arrangement of a connecting rod of a reciprocating piston internal combustion engine having at least one piston rod which is guided displaceably by means of a piston and a seal member which is connected to the supporting piston in a supporting cylinder which is provided in the connecting rod and has a longitudinal axis, the supporting piston enclosing at least one cylinder chamber with the supporting cylinder. The invention likewise relates to an adjusting arrangement having a supporting arrangement of this type.

Related Art

Adjusting arrangements of this type are well known from the prior art under the name VCR connecting rod. A variable compression can be realized in the internal combustion engine in a particularly simple way by means of an adjusting device of this type. It is possible here in a simple way by way of the eccentric member to change the connecting rod length and therefore the stroke of the piston in the cylinder of the internal combustion engine. A supporting arrangement and adjusting arrangement of the generic type are disclosed in DE 10 2005 055 199 A1. Here, however, the supporting arrangement has the disadvantage that an oscillating movement of the adjusting unit can occur on account of the increasing gas and mass forces at relatively high engine rotational speeds. The gas and mass forces are substantially transmitted in the VCR connecting rod by way of the supporting arrangement. On account of micromovements and the settling behavior of the piston on the connecting rod which is difficult to predict, an impact load can occur which can lead to increased wear up to a failure of the supporting arrangement.

It is therefore an object of the invention to avoid the abovementioned disadvantage in a simple and inexpensive way.

SUMMARY

The object of the invention is achieved by virtue of the fact that, on one side which is directed toward the cylinder chamber, the supporting piston has a brake piston that can be moved in the longitudinal axis and is mounted under prestress by a prestressing means. As a result, the maximum force of the settling momentum is limited. The design of the prestressing means takes place in an optimum manner in such a way that a relative movement between the brake piston and the supporting piston does not take place in broad parts of the operating range, but rather is present merely at very high loads.

The prestressing means comprise at least one spring, such as a leaf spring arrangement that is supported on a stop plate. In this way, the movement of the brake piston is absorbed very homogeneously and is limited by the stop plate.

The brake piston may have an opening arrangement that acts as a nozzle. As a result, a hydraulic space can be integrated that is to be filled by the oil of the respective cylinder chamber can be integrated. The stop plate can serve as a seal of the hydraulic space with respect to that side of the supporting piston that faces away from the opening arrangement. The opening arrangement may be configured as a throttle opening or as an annular gap.

The invention also relates to an adjusting arrangement having a supporting arrangement with two supporting cylinders each of which has a piston rod and one piston.

The invention will be described in greater detail using a drawing.

DETAILED DESCRIPTION

Figure 1:
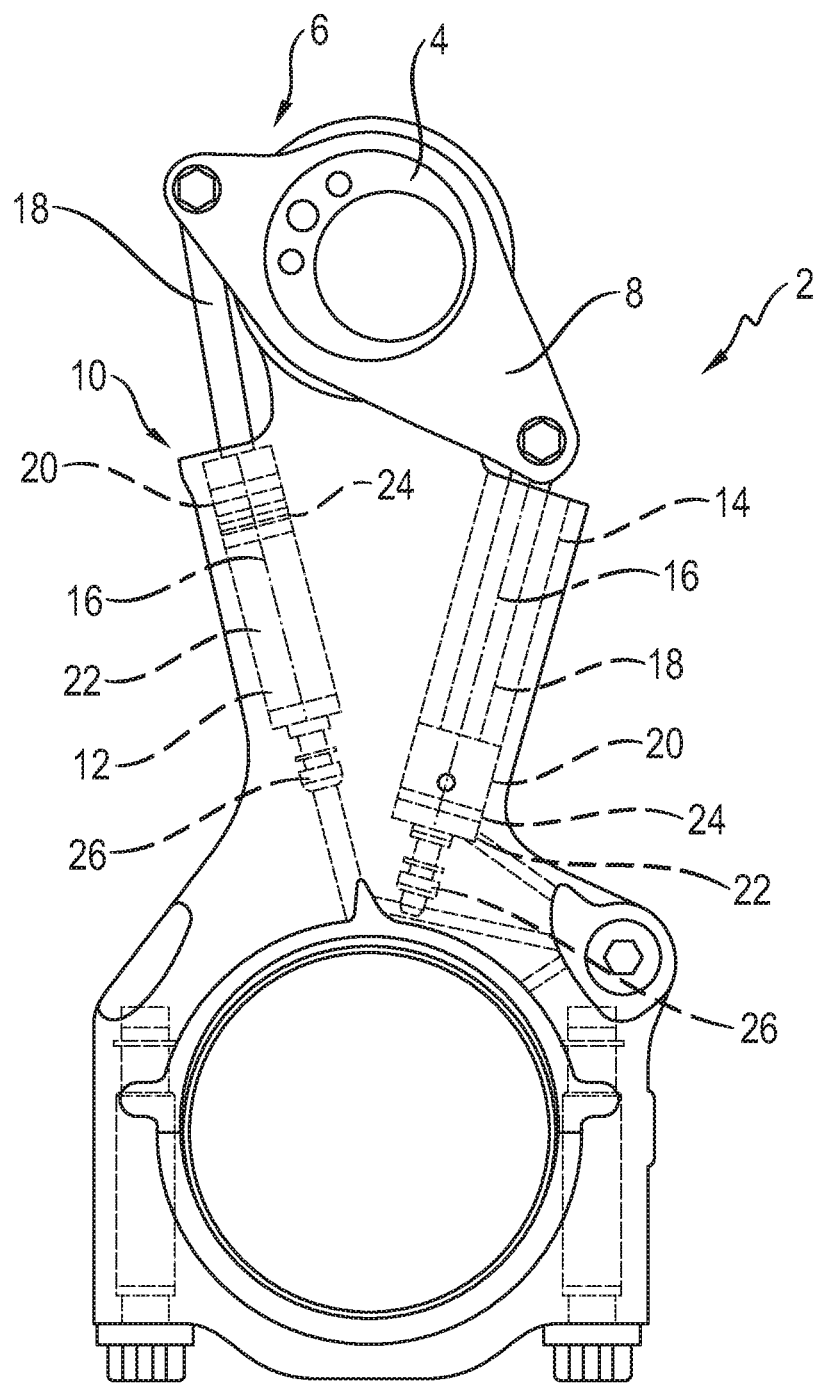
FIG. 1 shows a cut-away view of a connecting rod for a reciprocating piston internal combustion engine having an adjusting arrangement according to the invention.

FIG. 1 shows a VCR connecting rod 2 in a cut-away view. The VCR connecting rod 2 is used in a reciprocating piston internal combustion engine (not shown in further detail). The connecting rod 2 has a connecting rod eye 4 that is connected to a reciprocating piston of the reciprocating piston internal combustion engine. An adjusting arrangement 6 is provided so that a stroke change can be performed. The adjusting arrangement 6 has an eccentric member 8 that is arranged in the connecting rod eye 4. A supporting arrangement 10 is provided to transfer the eccentric member 8 in a targeted manner and to fix the eccentric member 8 in a desired position. The supporting arrangement 10 has two supporting cylinders 12, 14 each of which has a longitudinal axis 16. In each case one piston rod 18 with a supporting piston 20 is guided displaceably in the supporting cylinders 12, 14. The supporting piston 20 encloses a cylinder chamber 22 with the respective supporting cylinder 12, 14. The cylinder chamber 22 is filled with oil and supports the respective supporting piston 20 and therefore also the eccentric member 8 in the selected position. The respective supporting piston 20 has a seal 24 to seal the cylinder chamber. The respective supporting cylinder 12, 14 has valve members 26 to allow the oil to flow into or out of the respective cylinder chamber 22 during the transfer movement of the eccentric member 8.

Figure 2:
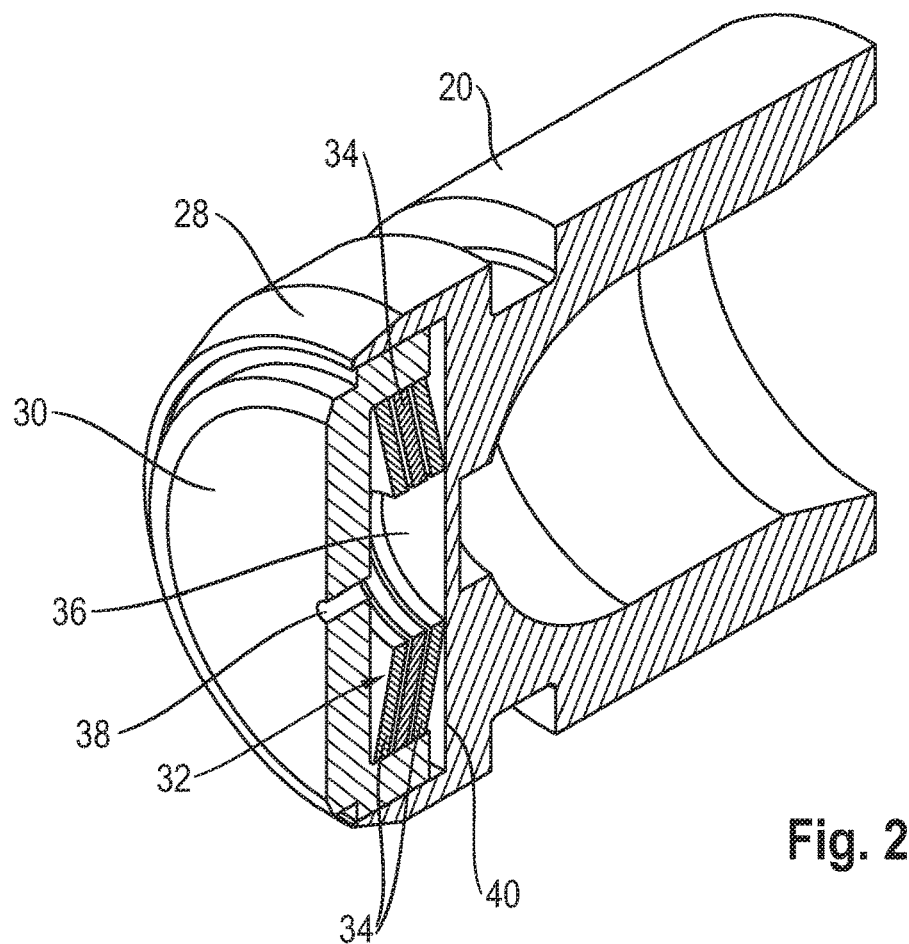
FIG. 2 shows a perspective sectional view of a supporting piston of a supporting arrangement according to the invention from FIG. 1.

FIG. 2 is a perspective sectional view of the supporting piston 20 to describe the supporting arrangement 10 of the invention in greater detail. The side of the supporting piston 20 that points toward the cylinder chamber 22 has a brake piston 30 mounted in the supporting piston 20 by prestressing means 32 so that the brake piston 30 can be moved in the direction of the longitudinal axis 16 (see FIG. 3 in this regard). The prestressing means 32 are configured as a leaf spring arrangement that is assembled in a known way from individual spring members 34. It should be clear that other spring members or spring arrangements can also be provided.

A hydraulic space 36 is integrated and is connected fluidically to the cylinder chamber 22 via an opening arrangement 38 that is configured in this embodiment as a throttle opening. As an alternative, the opening arrangement 38 can be configured as an annular gap. The hydraulic space 36 is sealed with respect to that side of the supporting piston 20 and that faces away from the throttle opening 38 by way of a wall 40 that can be configured alternatively as a separate plate. The wall 40 is configured as a stop plate for the leaf spring arrangement 32.

In the following text, the method of operation of the brake piston 30 will be described in greater detail using FIGS. 2 and 3.

FIG. 2 shows the supporting piston 20 with the brake piston 30 in the normal operating range. The brake piston 30 is prestressed by the leaf spring arrangement 32 in the direction of the cylinder chamber 22 (see FIG. 1 in this regard).

If an overload occurs briefly, the brake piston 30 is pressed counter to the stress of the leaf spring arrangement 32 in the direction of the wall 40. As a result, the settling momentum onto the piston rod 18 and the connecting rod 2 is decreased.

Figure 3:
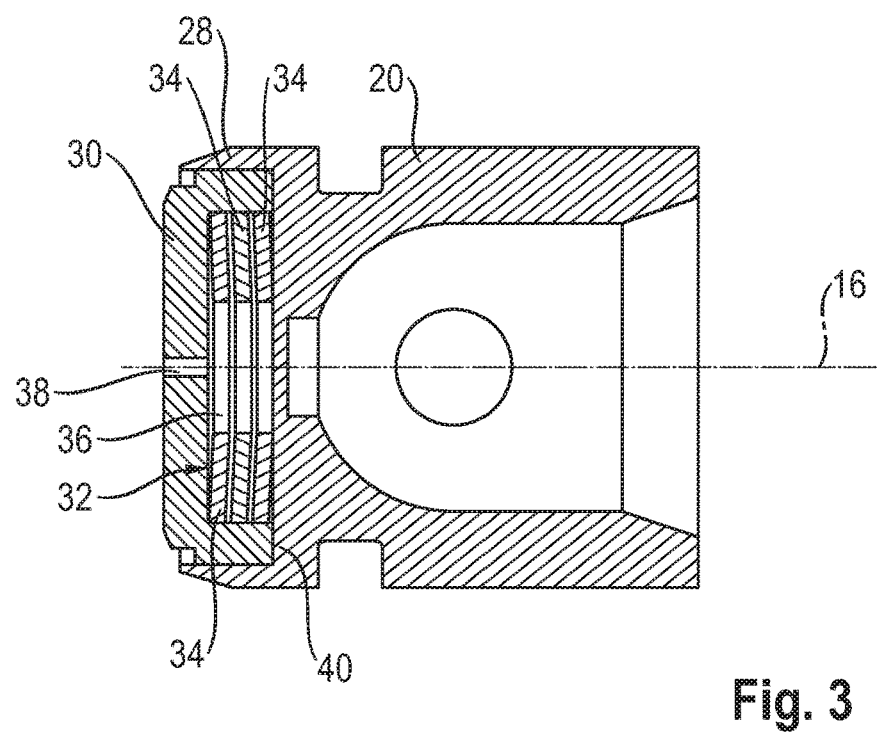
FIG. 3 shows a sectional view of the supporting piston from FIG. 2.

FIG. 3 shows the brake piston 30 in its end position where the brake piston having come to bear against the wall 40. In addition, the relative speed between the brake piston 30 and the supporting piston 20 can be influenced by the throttle opening 38, as a result of which an additional damping action is brought about.

What is claimed is:

1. A supporting arrangement for an eccentric member of an adjusting arrangement of a connecting rod of a reciprocating piston internal combustion engine having at least one piston rod guided displaceably by a piston and a seal that is connected to the supporting piston in a supporting cylinder that is provided in the connecting rod and has a longitudinal axis, the supporting piston enclosing at least one cylinder chamber with the supporting cylinder wherein the supporting piston has a brake piston on a side directed toward the cylinder chamber, the brake piston is mounted on the supporting piston and can be moved in the longitudinal axis; and a prestressing means for prestressing the brake piston.

2. The supporting arrangement of claim 1, wherein the prestressing means has at least one spring member.

3. The supporting arrangement of claim 2, wherein the prestressing means is configured as a leaf spring arrangement that is supported on a wall.

4. The supporting arrangement of claim 1, wherein the brake piston has an opening arrangement configured as a nozzle.

5. The supporting arrangement of claim 4, wherein the opening arrangement is configured as a throttle opening.

6. The supporting arrangement of claim 4, wherein the opening arrangement is configured as an annular gap.

7. An adjusting arrangement having the supporting arrangement of claim 1, wherein the supporting arrangement has two supporting cylinders each of which has one piston rod and one supporting piston.

\* \* \* \* \*